(12) United States Patent
Tompkins et al.

(10) Patent No.: US 10,635,188 B2
(45) Date of Patent: Apr. 28, 2020

(54) MAGNETIC USER INPUT ASSEMBLY OF A CONTROLLER DEVICE

(71) Applicant: Facebook Technologies, LLC, Menlo Park, CA (US)

(72) Inventors: Glen Jason Tompkins, Woodinville, WA (US); Bradley Morris Johnson, Edmonds, WA (US); Boyd Drew Allin, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/133,617

(22) Filed: Sep. 17, 2018

(65) Prior Publication Data
US 2020/0089334 A1 Mar. 19, 2020

(51) Int. Cl.
*G06F 3/0338* (2013.01)
*A63F 13/24* (2014.01)
*G05G 9/047* (2006.01)

(52) U.S. Cl.
CPC ............ *G06F 3/0338* (2013.01); *A63F 13/24* (2014.09); *G05G 9/047* (2013.01)

(58) Field of Classification Search
CPC ........ G05G 9/047; G05G 1/04; G06F 3/0338; G06F 2203/015; A63F 13/24; A63F 13/06
USPC ................................ 345/161; 463/36, 37, 38
See application file for complete search history.

(56) References Cited

U.S. PATENT DOCUMENTS

| | | | |
|---|---|---|---|
| 5,421,694 A | 6/1995 | Baker et al. | |
| 5,889,242 A * | 3/1999 | Ishihara | G05G 9/047 200/6 A |
| 6,232,959 B1 * | 5/2001 | Pedersen | G06F 1/1616 345/161 |
| 6,445,311 B1 | 9/2002 | Hohl et al. | |
| 6,515,650 B2 * | 2/2003 | Arita | G05G 9/047 345/156 |
| 6,992,602 B2 * | 1/2006 | Alexander | G05G 9/047 318/560 |
| 8,860,337 B2 | 10/2014 | Elenga et al. | |
| 2002/0080116 A1 | 6/2002 | Onodera et al. | |

(Continued)

OTHER PUBLICATIONS

PCT International Search Report and Written Opinion, PCT Application No. PCT/US2018/051746, dated Apr. 29, 2019, 15 pages.

*Primary Examiner* — Koosha Sharifi-Tafreshi
(74) *Attorney, Agent, or Firm* — Fenwick & West LLP

(57) ABSTRACT

A thumbstick assembly is configured to receive user input. The thumbstick assembly receives input through depression of a thumbstick, lateral rotation of the thumbstick, or some combination thereof. The thumbstick comprises a first surface, a rod, a spherical magnet. The first surface receives contact with a user's skin. The rod comprises a first end coupled to the first surface and a second end coupled to the spherical magnet. The thumbstick assembly further comprises a cup and a ring magnet. The cup is configured to receive the spherical magnet, wherein the spherical magnet is configured to move about a pivot point within the cup. The ring magnet is positioned about an outer surface of the cup and is configured to provide a restoring torque to the movement of the spherical magnet. The thumbstick assembly comprises one or more sensors that detect movement of the thumbstick relative to the cup.

20 Claims, 5 Drawing Sheets

(56) References Cited

U.S. PATENT DOCUMENTS

| | | |
|---|---|---|
| 2003/0126980 A1 | 7/2003 | Barden |
| 2003/0137394 A1* | 7/2003 | Romero Herrera .... G05G 9/047 |
| | | 338/32 H |
| 2006/0028184 A1 | 2/2006 | Lewis et al. |
| 2009/0278638 A1 | 11/2009 | Giroud et al. |
| 2010/0265176 A1* | 10/2010 | Olsson ..................... G05G 5/05 |
| | | 345/161 |
| 2011/0267039 A1 | 11/2011 | Musselman et al. |
| 2016/0361634 A1* | 12/2016 | Gassoway ............... A63F 13/24 |
| 2018/0200617 A1* | 7/2018 | Tiffany .................. A63F 13/24 |
| 2019/0179357 A1* | 6/2019 | Sirohiwala ............. G01D 5/145 |

* cited by examiner

MAGNETIC USER INPUT ASSEMBLY OF A CONTROLLER DEVICE

BACKGROUND

This disclosure relates generally to a controller device for receiving user input, and specifically to a magnetic user input assembly of a controller device.

Controller devices in an artificial reality system often include input features (e.g. buttons, thumbsticks, triggers, etc.). Some controller devices comprise one or more gimbals to enable several degrees of freedom for the input features. However, gimbals are typically large and can be difficult to integrate into a controller device that is configured to be held in a hand of a user and have a small, ergonomic form factor. In addition, due to the configuration of a gimbal mechanism, the motion of a gimbal along one or more axes can often have substantial lag between a desired motion of the gimbal and the actual motion of the gimbal. These factors can significantly impact a user's experience when interacting with the artificial reality system.

SUMMARY

A user input assembly is configured to receive user input. The user input assembly may be a part of a controller device, which may be a component of an artificial reality system. In some embodiments, the user input assembly is configured to receive input through depression of a thumbstick of the user input assembly, lateral rotation of the thumbstick, or some combination thereof. The thumbstick comprises a first surface, a rod, a spherical magnet. The first surface is configured to receive contact with a skin surface of a user. The rod comprises a first end and a second end. The first end of the rod is coupled to the first surface, and the second end of the rod is coupled to the spherical magnet. The user input assembly further comprises a cup and a ring magnet. The cup is configured to receive the spherical magnet, wherein the spherical magnet is configured to move about a pivot point within the cup. The ring magnet is positioned about an outer surface of the cup, such that the ring magnet surrounds the spherical magnet positioned within the cup. The ring magnet is configured to provide a restoring torque to the movement of the spherical magnet. In some embodiments, the user input assembly comprises one or more sensors that detect movement of the thumbstick relative to the cup. In some embodiments, a capacitive sensing assembly may be integrated with the user input assembly, wherein the first surface, the rod, and the spherical magnet are composed of conductive materials. The capacitive sensing assembly may be configured to detect a proximity of the user's skin to the first surface of the thumbstick.

Figure 1:
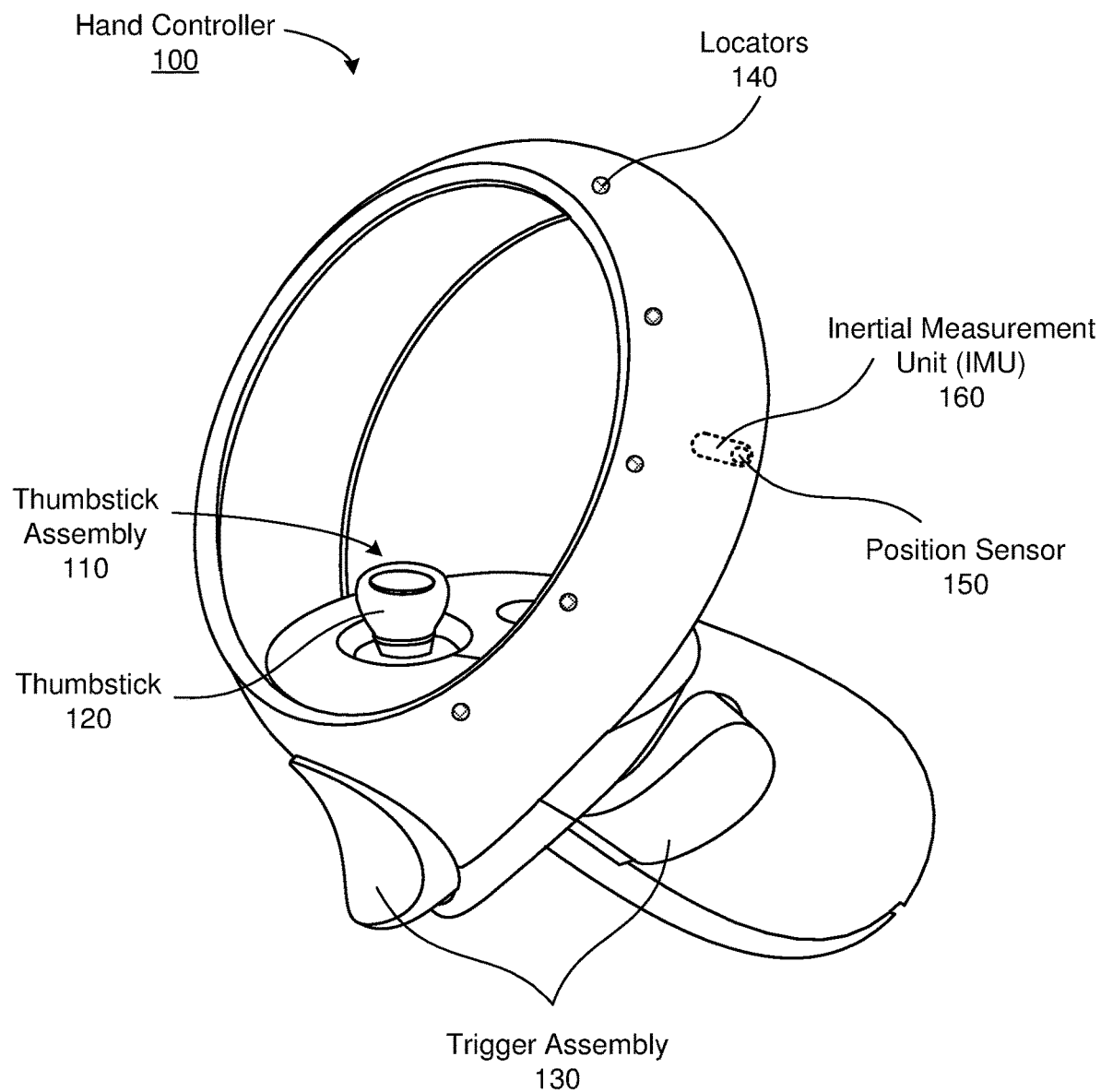
FIG. 1 is a perspective view of a hand controller, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic sensation, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an eyewear device, a head-mounted display (HMD) assembly with the eyewear device as a component, a HMD connected to a host computer system, a standalone HMD, a mobile device or computing system, or any other hardware platform capable of providing artificial reality content to one or more viewers. In addition, the artificial reality system may implement multiple controller devices for receiving user input which may influence the artificial reality content provided to the user.

System Architecture

A hand controller is a controller device that is configured to be held in a hand of user. The hand controller may include one or more user input assemblies, which may include buttons, triggers, thumbsticks, or some combination thereof that are each configured to receive user input when actuated by one or more of the user's fingers. While the embodiments included herein describe the user input assembly as a thumbstick assembly comprising a thumbstick as an example, other embodiments may include other types of user input assemblies, such as buttons, triggers, or some combination thereof in lieu of the thumbstick assembly and/or thumbstick or in combination with the thumbstick assembly and/or thumbstick. In these embodiments, the other types of user input assemblies may have a similar structure and/or configuration to the thumbstick assembly described herein that enables a user to provide user input in a seamless way to the user input assembly. In one embodiment, the hand controller includes a thumbstick assembly that is configured to receive input through depression of a thumbstick, lateral rotation of the thumbstick, or some combination thereof. In one embodiment, the thumbstick of the thumbstick assembly includes a first surface, a rod, and a spherical magnet. The first surface is configured to receive contact with a skin surface of a user. The rod has a first end and a second end, where the first end of the rod is coupled to the first surface. The spherical magnet is coupled to the second end of the rod. In one embodiment, the rod is a screw, and the spherical magnet includes a threaded interface for mating with the screw. The thumbstick may include a thumb stick knob that is coupled to the first end of the rod, and the first surface may be part of the thumbstick knob. The thumbstick knob provides an ergonomic and stable surface for the user to interact with the thumbstick assembly using, for example, their thumb. The thumbstick assembly further includes a cup having a ring magnet positioned about an outer surface of the cup. The cup is configured to receive the spherical magnet, and the spherical magnet is configured to move about a pivot point within the cup. The ring magnet is configured to surround the spherical magnet such that the ring magnet provides a restoring torque to the movement of the spherical magnet. As a user moves the thumbstick via the thumbstick knob, the spherical magnet moves within the cup, and one or more sensors are configured to detect the corresponding movement of the rod coupled between the thumbstick knob and the spherical magnet along one or more axes. Accordingly, the sensors generate signals that correspond to an amount of movement of the thumbstick relative to the cup.

In one embodiment, the hand controller includes a capacitive sensing assembly. The capacitive sensing assembly enables the hand controller to detect and measure a position of the thumbstick, a displacement of the thumbstick, a proximity of a user's skin surface to the top plate of the thumbstick, or some combination thereof. The capacitive sensing assembly includes a leaf spring that couples to a portion of the spherical magnet that is exposed through an opening in the cup. The leaf spring is configured to move and flex as a result of rotation and/or displacement of the spherical magnet. The leaf spring is electrically coupled to a controller that processes signals generated by the leaf spring. In some embodiments, the capacitive sensing assembly is integrated with the thumbstick assembly. For example, the first surface, the rod, and the spherical magnet may be composed of a conductive material, thus forming a conductive circuit with the leaf spring and the controller. As a user contacts the first surface, the controller receives signals via the leaf spring and detects a corresponding change in capacitance.

FIG. 1 is a perspective view of a hand controller 100, in accordance with one or more embodiments. The hand controller 100 is an embodiment of a controller device including a thumbstick assembly 110. In the embodiment of FIG. 1, the hand controller 100 includes a thumbstick assembly 110 including a thumbstick 120, a trigger assembly 130, one or more locators 140, a position sensor 150, and an inertial measurement unit (IMU) 160. In some embodiments, the hand controller 100 also includes a capacitive sensing assembly that may be configured to be a thumbstick assembly 110, a trigger assembly 130, one or more buttons, or a combination thereof. In some embodiments, the hand controller 100 contains additional components than those listed, e.g., the hand controller 100 has multiple capacitive sensing assemblies or the hand controller 100 has multiple IMUs 150 and multiple position sensors 160. In the embodiment of FIG. 1, the hand controller 100 is configured to operate with one hand of the user; however, in other embodiments, a second hand controller with mirror symmetry in relation to the hand controller 100 may be configured to operate with the other hand of the user. In one embodiment, the hand controller 100 is a component of an artificial reality system.

The thumbstick assembly 110 includes the thumbstick 120 that receives input from a user. The thumbstick assembly 110 is configured to receive input through depression of the thumbstick 120, lateral rotation of the thumbstick 120, or some combination thereof. Lateral rotation of the thumbstick 120 includes rotation about a pivot point of the thumbstick. The lateral rotation of the thumbstick 120 can be measured in terms of angular displacement of a long axis of the thumbstick 120 relative to the long axis of the thumbstick 120 in a neutral position. The neutral position of the thumbstick 120 is a static position of the thumbstick 120 relative to the thumbstick assembly 110 when user input is not provided to the thumbstick 120. In some embodiments, the thumbstick 120 may be configured to principally rotate about the pivot point of the thumbstick 120 (i.e., spinning the thumbstick 120 clockwise or counterclockwise about the long axis of the thumbstick 120. Generally, movement of the thumbstick 120 relative to the thumb stick assembly 110 enables a user to interact with an artificial reality environment and may influence the artificial reality content provided to the user. The thumbstick assembly 110 will be discussed in greater detail in conjunction with FIGS. 2A, 2B, 3A, and 3B.

The trigger assembly 130 contains one or more triggers that each receive input when depressed. Each trigger of the trigger assembly 130 is fixed at a point providing rotational movement of the trigger about the fixed point. In one embodiment, a trigger receives an input when the trigger is rotated more than some threshold degree. In another embodiment, a trigger may detect a range of angular rotation of the trigger. In some embodiments, one or more triggers are also capacitive sensors of the capacitive sensing assembly capable of detecting a proximity of the user's skin to the trigger.

The one or more locators 140 are objects located in specific positions on the hand controller 100. In some embodiments, each locator 140 may be placed above or below an exterior surface of the hand controller 100. Each locator 140 may be a light emitting diode (LED), a corner cube reflector, a reflective marker, a type of light source that contrasts with an environment in which the hand controller 100 operates, or some combination thereof. In embodiments where the locators 140 are active (i.e., an LED or other type of light emitting device), the locators 140 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof. In embodiments where the locators 140 are passive, the locators 140 may reflect light in the visible band (~380 nm to 750 nm), in the infrared (IR) band (~750 nm to 1 mm), in the ultraviolet band (10 nm to 380 nm), some other portion of the electromagnetic spectrum, or some combination thereof. The locators 140 will be described in greater detail in conjunction with FIG. 4.

The position sensor 150 generates one or more measurement signals in response to motion of the hand controller 100. The position sensor 150 may be located external to the IMU 160, internal to the IMU 160, or some combination thereof. The position sensor 150 will be described in greater detail in conjunction with FIG. 4.

The IMU 160 is an electronic device that generates IMU data. Based the measurement signals from the position sensor 150, the IMU 160 generates IMU data indicating an estimated position of the hand controller 100 relative to an initial position of the hand controller 100. The IMU 160 will be described in greater detail in conjunction with FIG. 4.

Figure 2A:
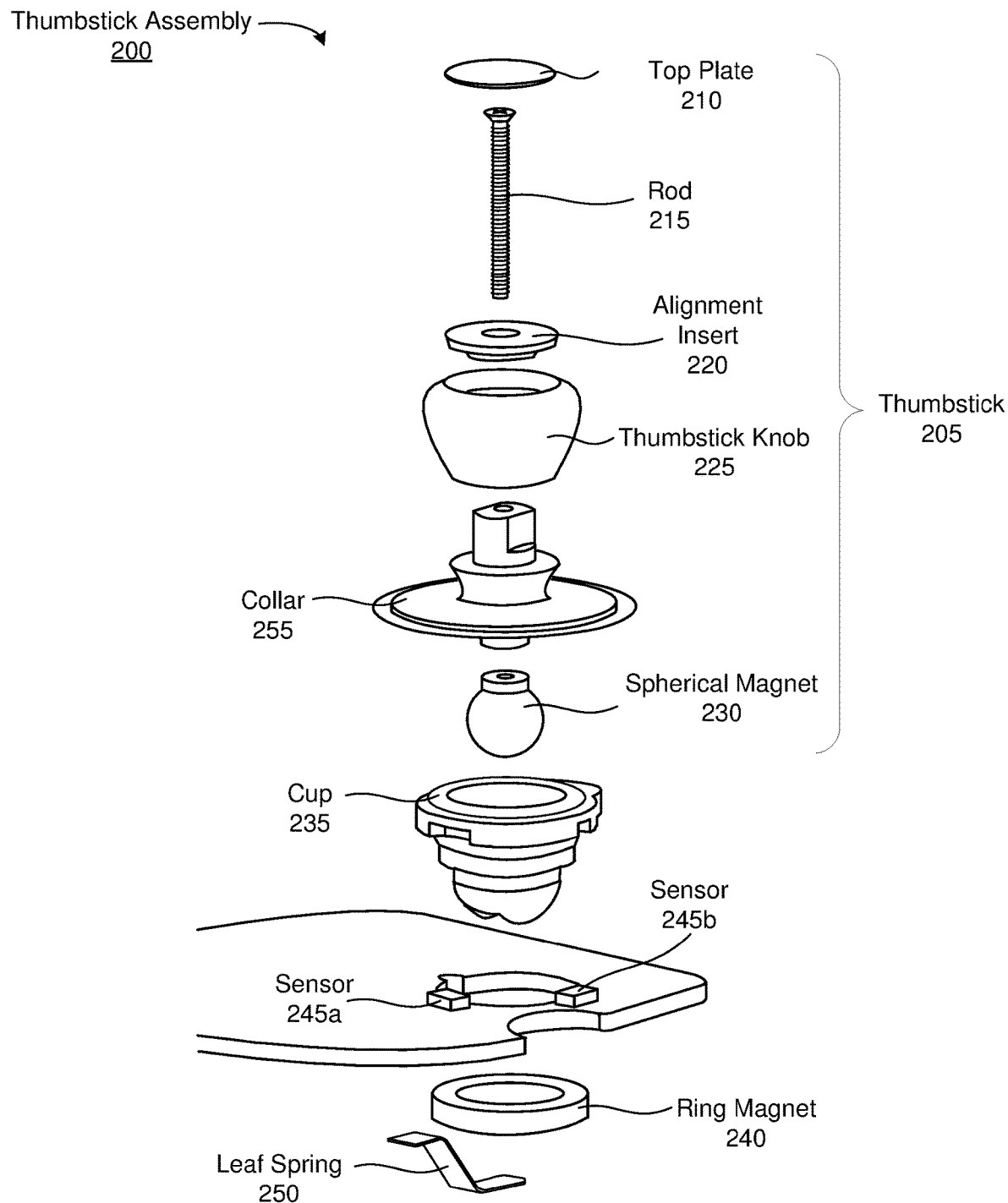
FIG. 2A is an exploded view of a thumbstick assembly, in accordance with one or more embodiments.

FIG. 2A is an exploded view of a thumbstick assembly 200, in accordance with one or more embodiments. The thumbstick assembly 200 may be an embodiment of the thumbstick assembly 110 in FIG. 1. In the embodiment of FIG. 2A, the thumbstick assembly 200 includes a thumbstick 205, which includes a top plate 210, a rod 215, an alignment insert 220, a thumbstick knob 225, and a spherical magnet 230. The thumbstick assembly 200 further includes a cup 235, a ring magnet 240, two sensors 245a, 245b, a leaf spring 250, and a collar 255. The thumbstick assembly 200 is mounted within the handheld controller 100 such that a top portion of the thumbstick 205 protrudes from an opening in the handheld controller 100. In some embodiments, the thumbstick assembly 200 includes additional components than those illustrated, e.g., a controller (not shown) that is electrically coupled to the leaf spring 250, or less components than those listed, e.g., the alignment insert 220 and the thumbstick knob 225 may be of uniform construction or the thumbstick assembly 200 may not include the thumbstick knob 225 and/or the collar 255. In alternative configurations, different and/or additional components may be included in the thumbstick assembly 200.

The thumbstick 205 receives input from a user. The thumbstick 205 may be an embodiment of the thumbstick 120. As described with regard to FIG. 1, a user may actuate the thumbstick 120, which enables a user to interact with an artificial reality environment and may influence the artificial reality content provided to the user. The thumbstick 205 is configured to receive input through depression of the thumbstick 205, lateral rotation of the thumbstick 205, or some combination thereof. Lateral rotation of the thumbstick 120 includes rotation about a pivot point of the thumbstick 120 (i.e., angular displacement of the thumbstick relative to a long axis of the thumbstick 120 in a neutral position). The neutral position of the thumbstick 120 is a static position of the thumbstick 120 relative to the thumbstick assembly 110 when user input is not provided to the thumbstick 120. In the embodiment of FIG. 2A, the thumbstick 205 includes the top plate 210, the rod 215, the alignment insert 220, the thumbstick knob 225, and the spherical magnet 230. In some embodiments, components of the thumbstick 205 may be integrated together, e.g., the alignment insert 220 and the thumbstick knob 225, the top plate 210 and the alignment insert 220, the top plate 210 and the rod 215, or some combination thereof.

The top plate 210 is positioned at a top portion of the thumbstick 205. The top plate 210 has an exterior surface and an interior surface. The user of the thumbstick assembly 200 contacts the exterior surface when providing input to the thumbstick 205. The interior surface is opposite that of the exterior surface and couples to the rod 215. In one embodiment, the top plate 210 is composed of a conductive material, a semiconducting material, or a combination thereof. In some embodiments, the top plate 210 may be composed of a conductive coating on some other non-conductive material. In these embodiments, the thumbstick assembly 200 measures a surface capacitance of the top plate 210. The surface capacitance of the top plate 210 is based on a proximity of the user's skin to the exterior surface of the top plate 210. As the user's skin (e.g. a finger) approaches the exterior surface of the top plate 210, the proximity of the user's skin to the exterior surface affects an amount of air between the user's skin and the top plate 210. The amount of air between the user's skin and the top plate 210 affects the surface capacitance of the top plate 210. Similarly, as the user's skin contacts the exterior surface of the top plate 210, a pressure applied by the user's skin to the top plate 210 and a contact area of the user's skin to the exterior surface of the top plate 210 may also affect the surface capacitance. Specifically in embodiments where the top plate 210 is a flexible material, as the user applies the pressure, the top plate 210 flexes changing the surface capacitance of the portion of the top plate 210 that flexes.

The rod 215 couples the top plate 210 and the spherical magnet 230. The rod 215 has a first end and a second end. In the embodiment of FIG. 2A, the first end of the rod 215 is coupled to the top plate 210, and the second end of the rod 215 is coupled to the spherical magnet 230. The rod 215 may be composed of a rigid material (e.g., hard plastics or metal). In one embodiment, the rod 215 is a screw. The rod 215 may be a single-headed screw or a double-headed screw. In the embodiment of FIG. 2A, the rod 215 is a single-headed screw with threads on the second end, and the spherical magnet 230 includes a threaded interface for mating with the second end. In an alternate embodiment, the rod 215 is a single-headed screw with threads on the first end, and the top plate 210 includes a threaded interface for mating with the first end. In an alternate embodiment, the rod 215 and the spherical magnet 230 may not include respective threaded interfaces, and the rod 215 may be configured to mate with the spherical magnet 230 via an interference fit (e.g., press fit, friction fit, thermal shrink fit, etc.), an adhesive, or some combination thereof. In this embodiment, the spherical magnet 230 may include a channel through which the rod 215 is inserted and protrudes from. In an embodiment in which the rod 215 is a double-headed screw, both the top plate 210 and the spherical magnet 230 include respective threaded interfaces for mating with respective ends of the rod 215. In some embodiments, the top plate 210, the rod 215, and the spherical magnet 230 are integrally formed. In the embodiment of FIG. 2A, an axis along length of the rod 215 corresponds to a long axis of the thumbstick 205 (shown in FIG. 2B). In one embodiment, the rod 215 is composed of a conductive material, a semiconducting material, or a combination thereof. In some embodiments, the rod 215 may be composed of a conductive coating on some other non-conductive material.

The alignment insert 220 is positioned at a top portion of the thumbstick knob 225. The alignment insert 220 may insert into an opening of the thumbstick knob 225. The alignment insert 220 may be secured to the thumbstick knob 225 with a securing mechanism (e.g., adhesive, threaded interface, or other suitable securing method). In the embodiment of FIG. 2A, the alignment insert 220 includes a hole that is configured to receive the rod 215. The alignment insert 220 may be composed of an insulating material, a semiconducting material, or a combination thereof. The alignment insert 220 may be composed of a rigid material (e.g., hard plastics), a flexible material (e.g., rubber, flexible polymer, etc.), or some combination thereof. In some embodiments, the alignment insert 220 and the thumbstick knob 225 are integrally formed.

The thumbstick knob 225 provides an ergonomic surface for the user to interact with the thumbstick assembly 200. For example, a user may rest, e.g., their thumb on the thumbstick knob 225 such that their thumb contacts the top plate 210 when using the thumbstick assembly 200. The thumbstick knob 225 may be composed of an insulating material, a semiconducting material, or a combination thereof. The thumbstick knob 225 may be shaped to have a uniform or a varying thickness all around. The thumbstick knob 225 may be composed of a rigid material (e.g., hard plastics), a flexible material (e.g., rubber, flexible polymer, etc.), or some combination thereof. In the embodiment of FIG. 2A, the thumbstick knob 225 is conically shaped with rounded edges; however, in other embodiments, the thumbstick knob 225 may be spherical, pyramidal, some other regular or irregular polygonal shape, or a similar ergonomic shape that is configured to provide a comfortable surface for the user to interact with.

The spherical magnet 230 is a spherical magnet about which the thumbstick 205 is configured to pivot. The spherical magnet 230 is designed to be inserted into the cup 235 and positioned against an interior surface within the cup 235. In the embodiment of FIG. 2A, the spherical magnet 230 includes a threaded interface and a substantially spherical surface profile. The threaded interface mates with the second end of the rod 215. The spherical surface profile mates with a complementary interior surface of the cup 235 when the spherical magnet 230 is positioned within the cup 235. In some embodiments, the spherical magnet 230 is substantially spherical (i.e., most or all of the surface area of the spherical magnet 230 is spherical). In some embodiments, the spherical magnet 230 includes one or more non-spherical portions, such as a change in the radius of curvature, one or more protrusions, one or more cavities, one or more interfaces for mating with the rod 215, or some combination thereof. The spherical magnet 230 is composed of a rigid material (e.g., hard plastics or metal). The material may be ferromagnetic, electromagnetic, magnetic polymers, or some combination thereof. In this configuration, the spherical magnet 230 produces a magnetic field. In one embodiment, the spherical magnet 230 is composed of a conductive material, a semiconducting material, or a combination thereof. In some embodiments, the spherical magnet 230 may be composed of a conductive coating on some other non-conductive material.

The cup 235 is a supporting structure that is configured to receive the spherical magnet 230. In the embodiment of FIG. 2A, the cup 235 includes an exterior surface and an interior surface. The exterior surface of the cup 235 includes an interface for coupling to an inner surface of the ring magnet 240. In the embodiment of FIG. 2A, the exterior surface of the cup 235 also includes an opening on a bottom portion of the cup 235 that exposes a portion of the spherical magnet 230 when positioned within the cup 235 (shown in FIG. 3B). The interior surface of the cup 235 has a radius of curvature that is complementary to the surface profile of the spherical magnet 230. By having complementary surface profiles, the cup 235 aligns the spherical magnet 230, and consequently the thumbstick 205, within the thumbstick assembly 200. In addition, the complementary surface profiles enable the spherical magnet 230 to move relative to the cup 235 when positioned within the cup 235. Specifically, the spherical magnet 230 is configured to pivot about a pivot point (shown in FIG. 2B). The pivot point may be located at a center of the spherical magnet 230 or at a center within the cup 235. In the embodiment of FIG. 2A, the cup 235 is composed of an insulating material.

The configuration of the spherical magnet 230 capable of moving relative to the cup 235 enables the thumbstick 205 to move in response to receiving user input. As previously discussed, the thumbstick 205 receives input through depression of the thumbstick 120, lateral rotation of the thumbstick 120, or some combination thereof. Lateral rotation of the thumb stick 120 corresponds to rotation of the spherical magnet 230 about the pivot point within the cup 235. The lateral rotation of the thumbstick 120 can be measured in terms of angular displacement of the long axis of the thumbstick 120 (i.e., the axis along the length of the rod 215) relative to the long axis of the thumbstick 120 in a neutral position. In one embodiment, the thumbstick 205 is configured to laterally rotate in any direction in 360 degrees.

In one embodiment, the thumbstick assembly 200 may include one or more guides that guide the rotation of the thumbstick 205 such that the thumbstick 205 laterally rotates about the pivot point to move along one or more defined axes. For example, the thumbstick 205 may laterally rotate along an x-axis and a y-axis. The x-axis and the y-axis are orthogonal relative to each other and are both defined in a plane that is parallel to a diameter of the ring magnet 240. When user input is not provided to the thumbstick 205, the thumbstick 205 is in a neutral position. The neutral position of the thumbstick 205 is a static position of the thumbstick 205 relative to the cup 235. In the embodiment of FIG. 2A, the neutral position corresponds to the long axis of the thumbstick 205 in an orthogonal position relative to a diameter of the ring magnet 240 positioned about the outer surface of the cup 235.

The ring magnet 240 couples to the exterior surface of the cup 235. In the embodiment of FIG. 2A, the ring magnet 240 is composed of a rigid material (e.g., hard plastics or metal). The material may be ferromagnetic, electromagnetic, magnetic polymers, or some combination thereof. In this configuration, the ring magnet 240 produces a magnetic field. In the embodiment of FIG. 2A, the ring magnet 240 is substantially circular and includes a central hole. An inner surface of the ring magnet 240 is configured to couple an interface on the exterior surface of the cup 235 such that the ring magnet 240 is positioned within a threshold distance of the pivot point of the spherical magnet 230. The threshold distance may be within a few centimeters above or below the pivot point. As a result, the magnetic field of the ring magnet 240 interacts with the magnetic field of the spherical magnet 230. Specifically, the ring magnet 240 provides a restoring torque to the movement of the spherical magnet 230. In this configuration, the ring magnet 240 also supports the thumbstick 205 in the neutral position when user input is not provided to the thumbstick 205. In an alternate embodiment, there may be a series of magnets spaced around the exterior surface of the cup 235 instead of a ring magnet. In one embodiment, the ring magnet 240 is biased slightly downward (i.e., below the pivot point), thereby pulling the spherical magnet 230 into the cup 235. In this configuration, friction between the two components may dampen the restoring force on the thumbstick 205, may prevent the thumbstick 205 from rattling within the cup 235, or some combination thereof.

The sensors 245a, 245b detect movement of the rod 215 within the cup 235. In the embodiment of FIG. 2A, the sensors 245a, 245b are positioned around the exterior surface of the cup 235. Specifically, the sensor 245a is positioned along a first axis that intersects with a center point of the cup 235, and the sensor 245b is positioned along a second axis that intersects with the center point of the cup 235, and where the first axis and the second axis are orthogonal to each other. In this configuration, the sensor 245a and the sensor 245b are positioned at a 90 degree angle relative to each other. In addition, the sensors 245a, 245b are positioned along a plane that intersects a point along the length of the rod 215. It is to be noted that the point at which the plane intersects the length of the rod 215 may change along the length of the rod 215 as the rod 215 laterally rotates about the pivot point within the cup 235. The sensor 245a is oriented towards the center point of the cup 235, and the sensor 245b is oriented towards the center point of the cup 235. In this configuration, the sensor 245a is configured to detect movement of the rod 215 along the first axis, and the sensor 245b is configured to detect movement of the rod 215 along a second axis (wherein the first axis and the second axis may be an x-axis and a y-axis, respectively, or vice versa). In some embodiments, each sensor 245a, 245b is a Hall Effect sensor that is configured to measure variations in a magnetic field. In response to the thumbstick 205 receiving user input, the spherical magnet 230 pivots correspondingly about the pivot point, thereby displacing the rod 215 from the neutral position. Accordingly, the sensors 245a, 245b may detect a change in the magnetic field created by the rod 215 tilting towards or away from the sensors 245a, 245b. The sensors 245a, 245b generate signals that correspond to the amount of movement of the rod 215. The sensors 245a, 245b may send the generated signals to a controller (not shown) of the thumbstick assembly 200. A sensitivity of the sensors 245a, 245b, defined as the ratio between a measured change in the magnetic field created by movement of the rod 215 and the signal generated by the sensor, may vary based on the physical geometry of the thumbstick assembly 200 and a field strength of the spherical magnet 230 and the ring magnet 240. In the embodiment of FIG. 2A, the sensors 245a, 245b have a sensitivity of 2.5 millivolts/Gauss. The sensitivity of the sensors 245a, 245b may vary in different embodiments, for example, if the field strength of the spherical magnet 230 and the ring magnet 240 is increased or decreased if the distance between the spherical magnet 230 and the ring magnet 240 is increased or decreased, or some combination thereof. A voltage rating of each sensor 245a, 245b is selected based on voltage requirements of the thumbstick assembly 200 and a desired sensitivity of each sensor 245a, 245b. In some embodiments, the sensors 245a, 245b each have a voltage rating between 220 millivolts and 3.5 volts, inclusive.

The leaf spring 250 is a spring that detects movement of the spherical magnet 230 within the cup 235. In the embodiment of FIG. 2A, the leaf spring 250 is coupled to the spherical magnet 230 through the opening in the bottom portion of the cup 230 (shown in FIG. 3B). The leaf spring 250 may be configured to flex in response to the thumbstick 205 receiving user input (e.g., depression of the thumbstick 205 or lateral rotation of the thumbstick 205). Accordingly, the leaf spring 250 may generate signals where the amount of flexion in the leaf spring 250 corresponds to an amount of movement of the spherical magnet 230. The leaf spring 250 may be electrically coupled to the controller (not shown). In some embodiments, the leaf spring 250 is composed of several layers of conductive metals. In these embodiments, the top plate 210, the rod 215, the spherical magnet 230, and the leaf spring 250 form a capacitive sensing assembly that is integrated with the thumbstick assembly 200. The leaf spring 250 may be configured to transmit signals corresponding to a change in conductivity from the top plate 210 to the controller. Based on the signals, the controller determines a proximity of the user's skin to the top plate 210 by measuring a change in the surface capacitance as the user's skin draws near to or in contact with the top plate 210. In addition, the controller may determine a force applied to the thumbstick 205 by the user's skin and/or a contact area of the user's skin to the thumbstick 205. In addition to detecting the proximity of the user's skin to the top plate 210, the controller 440 may also determine a degree of rotation of the thumbstick 205.

In an alternate embodiment, the thumbstick assembly 200 may not include a leaf spring. In this embodiment, the cup 235 is composed of a conductive material and is electrically coupled to the controller (not shown). In this configuration, the cup 235 transfers a capacitive signal from the top plate 210, the rod 215, and the spherical magnet 230 directly to the controller. The material may be a resin having conductive properties (e.g., a carbon-filled resin), and the cup 235 may be manufactured via a molding process (e.g., injection molding or other suitable molding techniques). In this embodiment, the cup 235 may or may not include an opening on the bottom portion of the cup 235.

Figure 2B:
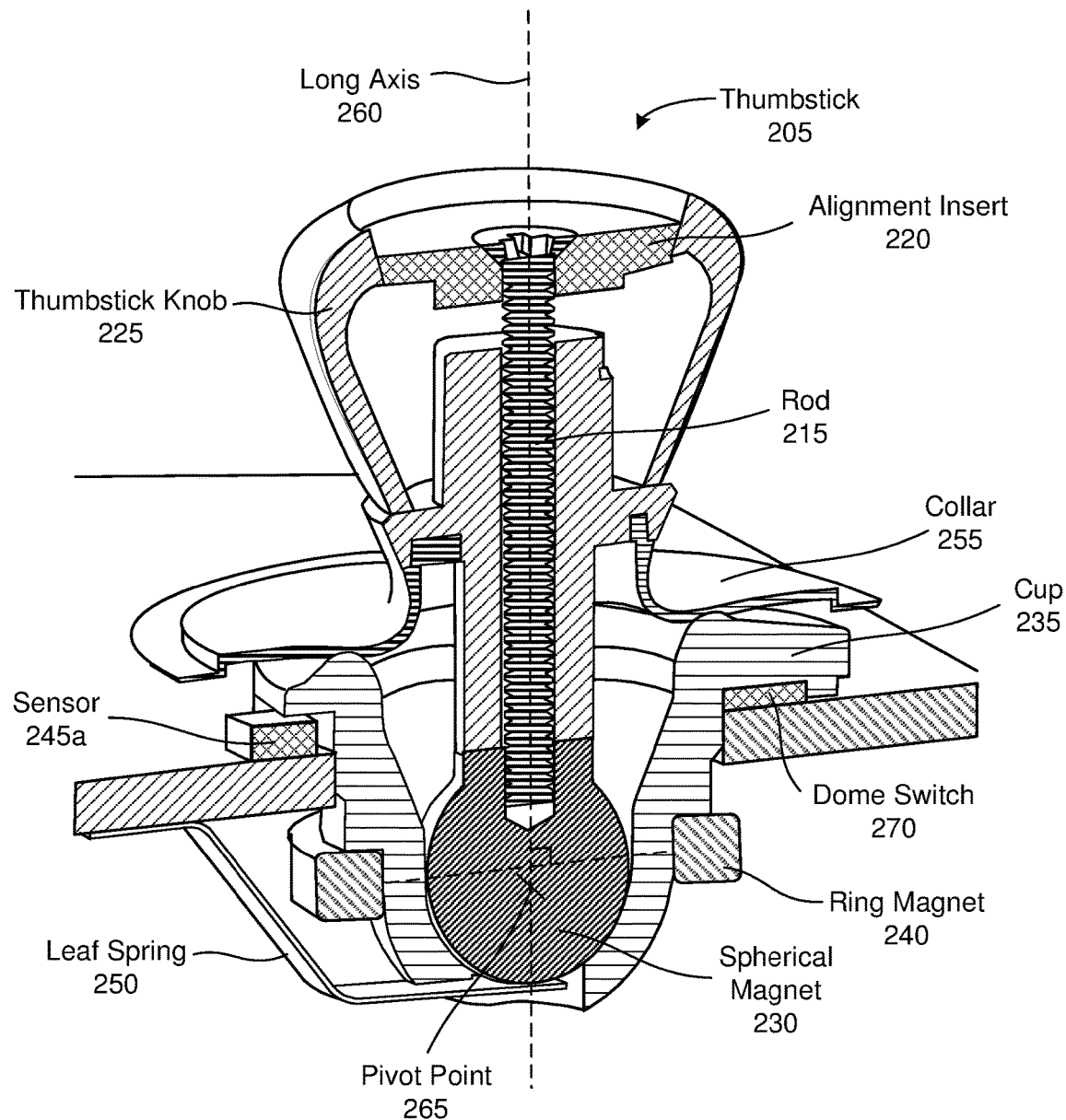
FIG. 2B is a cross-sectional view of the thumbstick assembly of FIG. 2A, in accordance with one or more embodiments.

The collar 255 supports the alignment of the thumbstick 205 within the thumbstick assembly 200. In the embodiment of FIG. 2, the collar 205 includes a hole through which the rod 215 passes. The collar 255 is positioned above the cup 235 and below the thumbstick knob 225. The collar 255 may be composed of a flexible material (e.g., rubber) that is configured to flex in accordance with movement of the thumbstick. In one embodiment, the collar 255 is configured to prevent axial rotation of the thumbstick 205 during use, wherein axial rotation is rotation about the long axis of the thumbstick 205. In one embodiment, similar to the ring magnet 240, the collar 255 may also provide a force to the thumbstick 205 to restore the thumbstick 205 to its neutral position. In some embodiments, the collar 255 may include or be integrated with additional components that help align the thumbstick 205. FIG. 2B is a cross-sectional view of the thumbstick assembly 200 of FIG. 2A, in accordance with one or more embodiments. In the embodiment of FIG. 2B, the thumbstick assembly 200 includes the thumbstick 205, which includes the rod 215, the alignment insert 220, the thumbstick knob 225, and the spherical magnet 230. The top plate 210 is not shown in FIG. 2B for clarity. The thumbstick assembly 200 further includes the cup 235, the ring magnet 240, the sensor 245a (sensor 245b is not shown), and the leaf spring 250.

FIG. 2B illustrates the components of the thumbstick assembly 200 assembled together, with the thumbstick 205 in its neutral position. The spherical magnet 230 of the thumbstick 205 is positioned within the cup 235 such that the complementary surface profiles of the spherical magnet 230 and the cup 235 abut each other. A long axis 260 of the thumbstick 205 is in an orthogonal position relative to a diameter of the ring magnet 240.

When user input is provided to the thumbstick 205, the spherical magnet 230 pivots about pivot point 265. In some embodiments, the thumbstick 2015 may be biased slightly downward such that the cup 235 dampens the movement of the spherical magnet 230. In addition, the thumbstick 205 may feel more stable to a user interacting with the thumbstick assembly 200 (i.e., the thumbstick 205 is less likely to rattle within the cup 235). The downward bias of the thumbstick 205 into the cup 235 may be a downward force applied to the rod 215 by the collar 255.

In some embodiments, the thumbstick assembly 200 further includes a dome switch 270. The dome switch 270 may be configured to reset the thumbstick 205. Resetting the thumbstick 205 may include restoring the thumbstick 205 to its neutral position, updating a reference of the neutral position of the thumbstick 205, or some combination thereof. The dome switch 270 may be positioned underneath a portion of the cup 235. In this configuration, a downward force applied to the thumbstick 205 thereby causes depression of the dome switch 270.

Figure 3A:
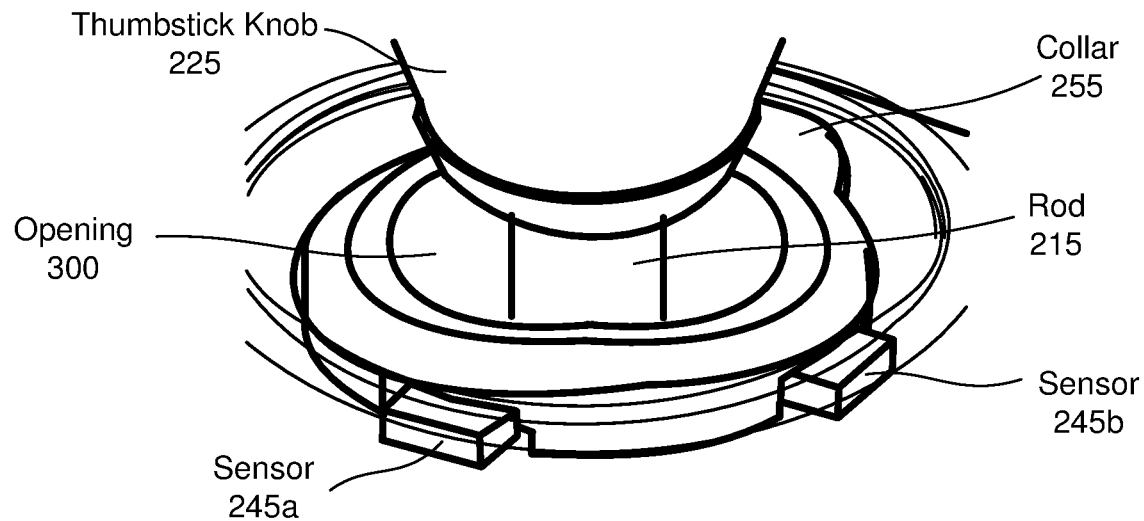
FIG. 3A is a zoomed-in view of a thumbstick positioned within a cup, in accordance with one or more embodiments.

FIG. 3A is a zoomed-in view of the thumbstick 205 positioned within the cup 235, in accordance with one or more embodiments. FIG. 3A illustrates the rod 215 and the thumbstick knob 225 of the thumbstick 205, which are assembled such that the thumbstick knob 225 protrudes from an opening 300 in the collar 255. A size of the opening 300 in the collar 255 is such that it provides enough space for the rod 215 to tilt back and forth within the opening 300. In this configuration, a user may interact with the protruding thumbstick knob 225 and provide user input to the thumbstick 205. In addition, FIG. 3A illustrates that the sensor 245a is positioned along a first axis that intersects with a center point of the cup 235, and the sensor 245b is positioned along a second axis that intersects with the center point of the cup 235, and where the first axis and the second axis are orthogonal to each other. In this configuration, the sensor 245a and the sensor 245b are positioned at a 90 degree angle relative to each other. The sensors 245a, 245b are positioned along a plane that intersects a point along the length of the rod 215. It is to be noted that the point at which the plane intersects the length of the rod 215 may change along the length of the rod 215 as the rod 215 laterally rotates about the pivot point within the cup 235. The sensor 245a is oriented towards the center point of the cup 235, and the sensor 245b is oriented towards the center point of the cup 235. In this configuration, the sensor 245a is configured to detect movement of the rod 215 along the first axis, and the sensor 245b is configured to detect movement of the rod 215 along a second axis (wherein the first axis and the second axis may be an x-axis and a y-axis, respectively, or vice versa). The sensors 245a, 245b generate signals that are transmitted to a controller (not shown) of the thumbstick assembly 200.

Figure 3B:
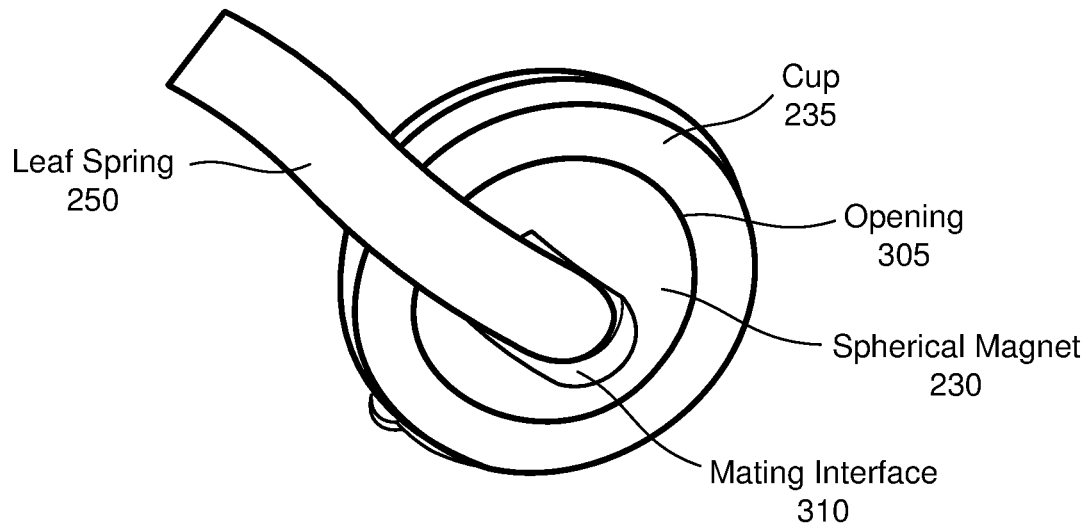
FIG. 3B is a perspective view of a leaf spring coupled to the thumbstick, in accordance with one or more embodiments.

FIG. 3B is a perspective view of the leaf spring 250 coupled to the thumbstick 205, in accordance with one or more embodiments. As illustrated in FIG. 3B, the leaf spring couples to the thumbstick 205 via the spherical magnet 230. A bottom portion of the cup 235 includes an opening 305 that exposes a portion of the spherical magnet 230, which is positioned within the cup 235. In the embodiment of FIG. 3B, the spherical magnet 230 includes a mating interface 310 that is configured to secure an end of the leaf spring 250. In this configuration, the leaf spring 250 may prevent rotation of the spherical magnet 230 in a clockwise or counterclockwise manner (relative to the long axis 260 of the thumbstick 205, shown in FIG. 2B). As the spherical magnet 230 pivots about the pivot point 265, the leaf spring 250 may generate signals that correspond to the movement of the spherical magnet 230. The leaf spring 250 may be electrically coupled to the controller. Based on the signals, the controller may determine a degree of rotation of the thumbstick 205. In some embodiments, the controller may determine a force applied to the thumbstick 205 by the user's skin and/or a contact area of the user's skin to the thumbstick 205. In embodiments in which the capacitive sensing assembly is integrated with the thumbstick assembly 200, the controller may determine a proximity of the user's skin to the top plate 210 (shown in FIG. 2A) by measuring a change in the surface capacitance as the user's skin draws near to or in contact with the top plate 210.

Figure 4:
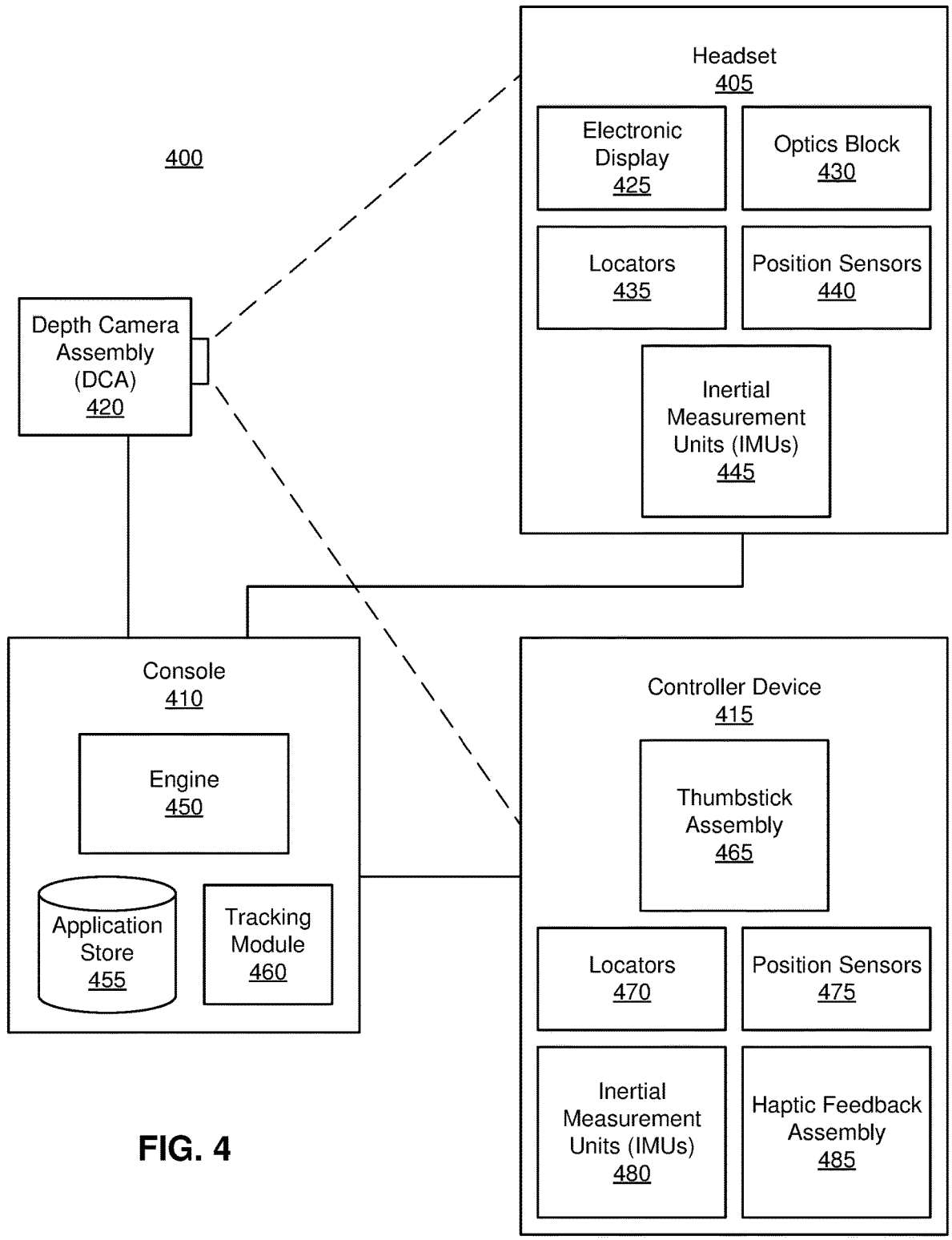
FIG. 4 is a system environment of a controller device in an artificial reality system, in accordance with one or more embodiments.

FIG. 4 is a system environment of a controller device in an artificial reality system, in accordance with one or more embodiments. The artificial reality system 400 may operate in an artificial reality environment, e.g., a virtual reality, an augmented reality, a mixed reality environment, or some combination thereof. The artificial reality system 400 shown by FIG. 4 comprises a headset 405, a controller device 415, and a depth camera assembly (DCA) 420 that is coupled to a console 410. While FIG. 4 shows an example artificial reality system 400 including one headset 405 and one controller device 415, in other embodiments, any number of these components may be included in the artificial reality system 400. For example, there may be multiple headsets 405 each having an associated controller device 415 with each headset 405 and controller device 415 communicating with the console 410. In alternative configurations, different and/or additional components may be included in the artificial reality system 400. Additionally, functionality described in conjunction with one or more of the components shown in FIG. 4 may be distributed among the components in a different manner than described in conjunction with FIG. 4 in some embodiments. For example, some or all of the functionality of the console 410 is provided by the headset 405.

The headset 405 may be a headset that presents content to a user comprising augmented views of a physical, real-world environment with computer-generated elements (e.g., two dimensional (2D) or three dimensional (3D) images, 2D or 3D video, sound, etc.). In some embodiments, the headset 405 presents virtual content to the user that is based in part on a real environment surrounding the user. For example, virtual content may be presented to a user of the headset 405. The user physically may be in a room, and virtual walls and a virtual floor of the room are rendered as part of the virtual content. The headset 405 may be a near-eye display (NED) or a head-mounted display (HMD).

The headset 405 may include an electronic display 425, an optics block 430, one or more locators 435, one or more position sensors 440, and one or more inertial measurement units (IMUs) 445. Some embodiments of the headset 405 have different components than those described in conjunction with FIG. 4. Additionally, the functionality provided by various components described in conjunction with FIG. 4 may be differently distributed among the components of the headset 405 in other embodiments, or be captured in separate assemblies remote from the headset 405.

The electronic display 425 displays 2D or 3D images to the user in accordance with data received from the console 410. In various embodiments, the electronic display 425 comprises a single electronic display or multiple electronic displays (e.g., a display for each eye of a user). Examples of the electronic display 425 include: a liquid crystal display (LCD), an organic light emitting diode (OLED) display, an active-matrix organic light-emitting diode display (AMOLED), waveguide display, some other display, or some combination thereof.

The optics block 430 magnifies image light received from the electronic display 425, corrects optical errors associated with the image light, and presents the corrected image light to a user of the headset 405. In various embodiments, the optics block 430 includes one or more optical elements. Example optical elements included in the optics block 430 include: a waveguide, an aperture, a Fresnel lens, a convex lens, a concave lens, a filter, a reflecting surface, or any other suitable optical element that affects image light. Moreover, the optics block 430 may include combinations of different optical elements. In some embodiments, one or more of the optical elements in the optics block 430 may have one or more coatings, such as partially reflective or anti-reflective coatings.

The locators 435 are objects located in specific positions on the headset 405 relative to one another. A locator 435 may be a light emitting diode (LED), a corner cube reflector, a reflective marker, a type of light source that contrasts with an environment in which the headset 405 operates, or some combination thereof. In embodiments where the locators 435 are active (i.e., an LED or other type of light emitting device), the locators 435 may emit light in the visible band (~380 nm to 740 nm), in the infrared (IR) band (~740 nm to 1 mm), in the ultraviolet (UV) band (10 nm to 380 nm), some other portion of the electromagnetic spectrum, or some combination thereof. In other embodiments, the locators 435 include passive elements (e.g., a retroreflector). In these embodiments, the locators 435 may reflect over various bands of lights or over a specific band of light (e.g., visible band, IR band, UV band, etc.).

The IMUs 445 are electronic devices that generate data indicating a position of the headset 405 based on measurement signals received from one or more of the position sensors 440. A position sensor 440 generates one or more measurement signals in response to motion of the headset 405. Examples of position sensors 440 include: one or more accelerometers, one or more gyroscopes, one or more magnetometers, another suitable type of sensor that detects motion, a type of sensor used for error correction of the IMUs 445, or some combination thereof. The position sensors 440 may be located external to the IMUs 445, internal to the IMUs 445, or some combination thereof.

Based on the one or more measurement signals from one or more position sensors 440, the IMUs 445 generate data indicating an estimated current position of the headset 405 relative to an initial position of the headset 405. For example, the position sensors 440 include multiple accelerometers to measure translational motion (forward/back, up/down, left/right) and multiple gyroscopes to measure rotational motion (e.g., pitch, yaw, and roll). In some embodiments, the IMUs 445 rapidly sample the measurement signals and calculates the estimated current position of the headset 405 from the sampled data. For example, the IMUs 445 integrate the measurement signals received from the accelerometers over time to estimate a velocity vector and integrate the velocity vector over time to determine an estimated current position of a reference point on the headset 405. Alternatively, the IMUs 445 provide the sampled measurement signals to the console 410, which interprets the data to reduce error. The reference point is a point that may be used to describe the position of the headset 405. The reference point may generally be defined as a point in space or a position related to the headset's 405 orientation and position.

The controller device 415 is a device that allows a user to send action requests and receive responses from the console 410. An action request is a request to perform a particular action. For example, an action request may be an instruction to start or end capture of image or video data, or an instruction to perform a particular action within an application. In some embodiments, the controller device 415 comprises one or more thumbstick assemblies 465, one or more locators 470, one or more position sensors 475, and one or more IMUs 480. The hand controller 100 is one embodiment of the controller device 415.

The thumbstick assembly 465 includes a thumbstick that is configured to receive input from a user. A user may actuate the thumbstick, which enables a user to interact with the artificial reality environment and may influence the artificial reality content provided to the user. The thumbstick is configured to receive input through depression of the thumbstick, lateral rotation of the thumbstick, or some combination thereof. The thumbstick assembly 465 includes the thumbstick, which includes a top plate, a rod, an alignment insert, a thumbstick knob, and a spherical magnet. The thumbstick assembly 200 further includes a cup, a ring magnet, two sensors, a leaf spring, and a collar. The thumbstick assembly 465 is mounted within the controller device 415 such that a top portion of the thumbstick protrudes from an opening in the controller device 415. In response to receiving user input, the thumbstick is configured to move relative to the cup. Movement of the thumbstick is detected by the two sensors and the leaf spring, which each generate signals that are transmitted to a controller of the thumbstick assembly 465. The ring magnet and the collar are designed to provide a restoring force to the movement of the thumbstick, such that the thumbstick biases toward a neutral position.

In one embodiment, a capacitive sensing assembly is integrated with the thumbstick assembly 465. The top plate, the rod, the spherical magnet, and the leaf spring may be composed of conductive materials, thereby creating a conductive circuit that is coupled to the controller of the thumbstick assembly 465. The controller may determine a proximity of the user's skin to the top plate by measuring a change in the surface capacitance as the user's skin draws near to or in contact with the top plate.

In some embodiments, the controller device 415 further comprises a haptic feedback assembly 485 for providing haptic feedback to the user of the artificial reality system 400. In some embodiments, the haptic feedback assembly 485 may provide haptic feedback to the user in accordance with instructions received from the console 410. For example, haptic feedback is provided when an action request is received, or the console 410 communicates instructions to the controller device 415 causing the controller device 415 to generate haptic feedback when the console 410 performs an action.

The depth camera assembly (DCA) 420 captures data describing depth information of a local area surrounding some or all of the headset 405 and the controller device 415. In one embodiment, the DCA 420 includes a light generator, an imaging device, and a DCA controller that may be coupled to both the light generator and the imaging device. The light generator illuminates a local area with illumination light, e.g., in accordance with emission instructions generated by the DCA controller. The DCA controller is configured to control, based on the emission instructions, operation of certain components of the light generator, e.g., to adjust an intensity and a pattern of the illumination light illuminating the local area. In some embodiments, the illumination light may include a structured light pattern, e.g., dot pattern, line pattern, etc. The imaging device captures one or more images of one or more objects in the local area illuminated with the illumination light. In another embodiment, the DCA 420 includes an imaging device to capture positions of the locators 435 associated with the headset 405 and the locators 470 of the controller device 415. The imaging device is configured to detect light emitted or reflected from locators 435 and 470 in a field of view of the imaging device. In embodiments where the locators 435 and 470 include passive elements (e.g., a retroreflector), the DCA 420 includes a light source that illuminates some or all of the locators 435 and 470, which retro-reflect the light towards the light source in the imaging device. The DCA 420 can compute the depth information using the data captured by the imaging device or the DCA 420 can send this information to another device such as the console 410 that can determine the depth information using the data from the DCA 420. In additional embodiments, the DCA 420 may be integrated as part of the headset 405 capturing depth information of the controller device 415 or other components in relation to a position of the headset 405.

The console 410 provides content to the headset 405 for processing in accordance with information received from one or more of: the headset 405 and the controller device 415. In the example shown in FIG. 4, the console 410 includes an application store 455, a tracking module 460 and an engine 440. Some embodiments of the console 410 have different modules or components than those described in conjunction with FIG. 4. Similarly, the functions further described below may be distributed among components of the console 410 in a different manner than described in conjunction with FIG. 4.

The application store 455 stores one or more applications for execution by the console 410. An application is a group of instructions, that when executed by a processor, generates content for presentation to the user. Content generated by an application may be in response to inputs received from the user via movement of the headset 405 or the controller device 415. Examples of applications include: gaming applications, conferencing applications, video playback applications, or other suitable applications.

The tracking module 460 calibrates the system environment 400 using one or more calibration parameters and may adjust one or more calibration parameters to reduce error in determination of the position of the headset 405 or of the controller device 415. Calibration performed by the tracking module 460 also accounts for information received from the IMUs 445 in the headset 405 and/or IMUs 445 included in the controller device 415. Additionally, if tracking of the headset 405 is lost, the tracking module 460 may re-calibrate some or all of the system environment 400.

The tracking module 460 tracks movements of the headset 405, the controller device 415, or some combination thereof using information from the one or more position sensors 440, the IMUs 445, the DCA 420, or some combination thereof. For example, the tracking module 460 determines a position of a reference point of the headset 405 in a mapping of a local area based on information from the headset 405. The tracking module 460 may also determine positions of the reference point of the headset 405 using data indicating a position of the headset 405 from the IMUs 445. The tracking module 460 may determine positions of or a reference point of the controller device 415 using data indicating a position of the controller device 415 from IMUs 445 included in the controller device 415. Additionally, in some embodiments, the tracking module 460 may use portions of data indicating a position of the headset 405 from the IMUs 445 to predict a future location of the headset 405. The tracking module 460 provides the estimated or predicted future position of the headset 405, the controller device 415, or both to the engine 440.

The engine 440 also executes applications within the system environment 400 and receives position information, acceleration information, velocity information, predicted future positions, or some combination thereof, of the headset 405 from the tracking module 460. Based on the received information, the engine 440 determines content to provide to the headset 405 for presentation to the user. For example, if the received information indicates that the user has looked to the left, the engine 440 generates content for the headset 405 that mirrors the user's movement in a virtual environment or in an environment augmenting the local area with additional content. Additionally, the engine 440 performs an action within an application executing on the console 410 in response to an action request received from the controller device 415 and provides feedback to the user that the action was performed. The provided feedback may be visual or audible feedback via the headset 405 or haptic feedback via the controller device 415.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A user input assembly comprising:
   a first surface configured to receive contact with a skin surface of a user;
   a rod comprising a first end and a second end, the first end of the rod coupled to the first surface;
   a spherical magnet that is coupled to the second end of the rod;
   a cup configured to receive the spherical magnet, wherein the cup is separate from the rod, and wherein the spherical magnet is configured to move about a pivot point within the cup; and
   a ring magnet positioned about an outer surface of the cup, the ring magnet surrounding the spherical magnet positioned within the cup, wherein the ring magnet is configured to provide a restoring torque to the movement of the spherical magnet.

2. The user input assembly of claim 1, wherein a portion of the cup has a radius of curvature that is complementary to a surface profile of the spherical magnet.

3. The user input assembly of claim 1, wherein the ring magnet is positioned such that a diameter of the ring magnet is within a threshold distance of the pivot point of the spherical magnet.

4. The user input assembly of claim 1, further comprising a knob coupled to the first end of the rod, wherein the first surface is part of the knob.

5. The user input assembly of claim 4, wherein actuation of the knob generates a signal that corresponds to an amount of movement of the knob relative to the cup.

6. The user input assembly of claim 4, further comprising one or more guides that are configured to restrict movement of the knob to move along a respective axis of the one or more guides.

7. The user input assembly of claim 4, further comprising a collar coupled between the knob and the cup, wherein the collar is composed of a flexible material configured to flex in accordance with movement of the knob relative to the cup.

8. The user input assembly of claim 1, further comprising a first sensor and a second sensor positioned about the outer surface of the cup, wherein the first sensor is positioned at a 90 degree angle relative to the second sensor, wherein the first sensor is configured to detect movement of the rod along a first axis and the second sensor is configured to detect movement of the rod along a second axis that is orthogonal to the first axis.

9. The user input assembly of claim 8, wherein the first sensor and the second sensor are each Hall Effect sensors.

10. The user input assembly of claim 1, wherein a static position of the user input assembly comprises the rod in an orthogonal position relative to a diameter of the ring magnet, and wherein the user input assembly further comprises a switch that is configured to restore the rod to the static position of the user input assembly.

11. The user input assembly of claim 1, wherein the cup is composed of an insulating material and the rod is composed of a conductive material.

12. The user input assembly of claim 11, further comprising:
a leaf spring comprising a first end and a second end, the first end of the leaf spring positioned within an opening at a bottom portion of the cup and abutting the spherical magnet; and
a controller electrically coupled to the second end of the leaf spring and configured to determine a surface capacitance that corresponds to the skin surface of the user contacting the first surface.

13. A handheld controller device comprising:
a user input assembly comprising:
a first surface configured to receive contact with a skin surface of a user;
a rod comprising a first end and a second end, the first end of the rod coupled to the first surface;
a spherical magnet that is coupled to the second end of the rod;
a cup configured to receive the spherical magnet, wherein the cup is separate from the rod, and wherein the spherical magnet is configured to move about a pivot point within the cup; and
a ring magnet positioned about an outer surface of the cup, the ring magnet surrounding the spherical magnet positioned within the cup, wherein the ring magnet is configured to provide a restoring torque to the movement of the spherical magnet.

14. The handheld controller device of claim 13, wherein a portion of the cup has a radius of curvature that is complementary to a surface profile of the spherical magnet.

15. The handheld controller device of claim 13, wherein the ring magnet is positioned such that a diameter of the ring magnet is within a threshold distance of the pivot point of the spherical magnet.

16. The handheld controller device of claim 13, further comprising a knob coupled to the first end of the rod, wherein the first surface is part of the knob.

17. The handheld controller device of claim 16, wherein actuation of the knob generates a signal that corresponds to an amount of movement of the knob relative to the cup.

18. The handheld controller device of claim 13, further comprising a first sensor and a second sensor positioned about the outer surface of the cup, wherein the first sensor is positioned at a 90 degree angle relative to the second sensor, wherein the first sensor is configured to detect movement of the rod along a first axis and the second sensor is configured to detect movement of the rod along a second axis that is orthogonal to the first axis.

19. The handheld controller device of claim 18, wherein the first sensor and the second sensor are each Hall Effect sensors.

20. The handheld controller device of claim 13, wherein the cup is composed of an insulating material and the rod is composed of a conductive material, and the handheld controller device further comprising:
a leaf spring comprising a first end and a second end, the first end of the leaf spring positioned within an opening at a bottom portion of the cup and abutting the spherical magnet; and
a controller electrically coupled to the second end of the leaf spring and configured to determine a surface capacitance that corresponds to the skin surface of the user contacting the first surface.

* * * * *